(12) United States Patent
Hoekstra

(10) Patent No.: US 6,445,178 B1
(45) Date of Patent: Sep. 3, 2002

(54) VEHICULAR MAGNETIC DISPLACEMENT SENSOR FOR DETERMINING AN OFFSET IN THE OUTPUT OF THE SENSOR

(75) Inventor: Eric J. Hoekstra, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/511,587

(22) Filed: Feb. 23, 2000

Related U.S. Application Data
(60) Provisional application No. 60/121,462, filed on Feb. 24, 1999.

(51) Int. Cl.[7] .............................. G01B 7/30; G01B 7/14; G01R 35/00
(52) U.S. Cl. ............. 324/207.12; 324/202; 324/207.24; 324/207.25
(58) Field of Search ................ 33/356, 361; 702/92; 324/207.12, 207.2, 247, 207.21, 207.24, 207.25; 73/1.76, 1.75

(56) References Cited

U.S. PATENT DOCUMENTS

| | | | |
|---|---|---|---|
| 4,490,674 A | * 12/1984 | Ito .............................. 324/208 |
| 4,660,161 A | 4/1987 | Okada ........................ 364/571 |
| 4,807,462 A | 2/1989 | Al-Attar ...................... 73/1 E |
| 4,841,449 A | 6/1989 | Suyama ...................... 364/449 |
| 4,852,012 A | 7/1989 | Suyama ...................... 364/449 |
| 4,866,627 A | 9/1989 | Suyama ...................... 364/457 |
| 4,953,305 A | 9/1990 | Van Lente et al. ............ 33/356 |
| 5,046,031 A | 9/1991 | Wanous ................... 364/571.02 |
| 5,165,269 A | 11/1992 | Nguyen ........................ 73/1 E |
| 5,187,872 A | 2/1993 | Dufour ........................ 33/356 |
| 5,255,442 A | 10/1993 | Schierbeek et al. ........... 33/361 |
| 5,297,063 A | 3/1994 | Cage ...................... 364/571.02 |
| 5,297,065 A | 3/1994 | Cage et al. ............. 364/571.05 |
| 5,390,122 A | 2/1995 | Michaels et al. ............ 364/443 |
| 5,532,583 A | * 7/1996 | Davis et al. ................. 324/202 |
| 5,581,899 A | 12/1996 | Brehler et al. ................. 33/356 |
| 5,632,092 A | 5/1997 | Blank et al. ................... 33/361 |
| 5,644,851 A | 7/1997 | Blank et al. ................... 33/361 |
| 5,761,094 A | 6/1998 | Olson et al. ................ 364/559 |
| 5,802,727 A | 9/1998 | Blank et al. ................... 33/361 |

OTHER PUBLICATIONS

Philips Semiconductor Sensors Data Handbook SC17, 1997, pp. 183–187.

* cited by examiner

*Primary Examiner*—Edward Lefkowitz
*Assistant Examiner*—Reena Aurora
(74) *Attorney, Agent, or Firm*—Van Dyke, Gardner, Linn & Burkhart, LLP

(57) ABSTRACT

A magnetic level sensor is adapted for interconnecting with a vertically moving component of a vehicle such that the level sensor determines a vertical orientation of the component of the vehicle relative to the frame or chassis of the vehicle. The magnetic level sensor includes a magnetic angular measurement device interconnected to the component of the vehicle such that vertical movement of the component causes a corresponding relative rotational movement of a magnetic element associated with the angular measurement device. An electronic control is included for analyzing an output of the angular measurement device and determining an angle of rotation of the magnetic element and thus a vertical movement of the component. The control further determines an error or offset in the output of the angular measurement device and adjusts an output of the control in response to the error or offset. The control thus continuously calibrates an output of the angular measurement device to account for manufacturing irregularities and drift in sensor output due to temperature variations and aging of the sensors and magnets over time.

36 Claims, 4 Drawing Sheets

VEHICULAR MAGNETIC DISPLACEMENT SENSOR FOR DETERMINING AN OFFSET IN THE OUTPUT OF THE SENSOR

This non-provisional application claims priority from U.S. provisional pat. application, Ser. No. 60/121,462, filed Feb. 24, 1999, which is hereby incorporated in its entirety herein by reference.

BACKGROUND OF THE INVENTION

This invention relates generally to magnetic angular measurement devices, and, more particularly, to a system for calibrating a magnetic angular measurement device.

Contactless angular measurement devices are known and are typically implemented to determine an angular orientation of a magnetic element on a shaft with respect to at least one magnetoresponsive sensor spaced from the rotating magnetic element, or vice versa. As the magnet rotates, the sensor or sensors generate a signal which may be analyzed to determine the angle of orientation of the magnet relative to the sensor. These measurement devices may be implemented such that the magnetic element is rotatably interconnected with a linearly moving component, such as a suspension unit or control arm of a vehicle. As the component moves vertically, this substantially linear movement may be translated to rotational movement or pivoting of the magnet relative to the sensor. The device may then determine the angle of rotation of the magnet, from which the corresponding displacement of the component on the vehicle is then calculated.

Typically, laser trimming of the sensors or the magnetic element has been used in order to offset errors which may arise due to an internal magnetization field of the sensors being misaligned with an external field of the magnet. Furthermore, the orientation of the magnetic field directions of the sensors relative to the external field directions of the magnetic elements must be known after the device is assembled. After the sensors have been trimmed and the angular measurement device has been fully assembled, the magnet is positionable relative to the sensors such that an internal magnetization vector of one of the sensors is substantially parallel to or otherwise positioned relative to a magnetization vector of the magnet at an initial zero or reference point. While this process is generally effective in manufacturing an accurate sensor for measuring the angular rotation of a magnet, laser trimming adds substantially to the overall cost of the angular measurement devices. Furthermore, any variations in positioning of one sensor relative to another may result in offsets or errors in the output of the device that are unaccounted for during the production of the devices.

An additional concern with these devices is that they typically require a rare earth type of permanent magnet, which is stronger and more magnetically stable than other magnetic materials, such as a common ferrite magnet. These permanent magnets are implemented in order to minimize the effects due to aging of the magnet over the life of the device or due to temperature variations surrounding the device. While this may improve the overall accuracy of the device over time, the rare earth permanent magnets also add to the cost of the devices.

Generally, a particular magnetic element is selected for use in these measurement devices such that the internal magnetic field within the sensors and generated by the magnetic element is substantially greater than any external fields associated with the surroundings of the magnet and sensor. This results in the sensors being saturated by the internal field of the magnetic element when the sensors and magnet are placed substantially near to each other, which further results in the external fields affecting the sensors in a substantially insignificant manner. This avoids the necessity of accounting for offsets due to varying external magnetic fields that is typically required in other magnetic systems, such as vehicle compass systems.

Furthermore, the magnetoresponsive sensors, such as magnetoresistive sensors, typically implemented in these measurement devices are operable in a non-linear mode, such that an output frequency of the sensors is doubled, whereby 180° rotation of the magnet generates a full cycle of a sine and cosine output signal of the sensors. In order to improve the accuracy of these non-contacting angular measurement devices, precise manufacturing and assembly of the sensors and the magnetic elements may be necessary. If a single sensor is implemented, the device may be more readily manufactured but is only accurate within a small range of rotation, typically less than approximately plus or minus 15°. Because the sensors are saturated, orienting two sensors in a predetermined manner, such as 45° relative to one another, allows for a measurement of a larger angle of rotation, within a range of 180°, or plus or minus 90° from an initial setting. However, the accuracy of such a device is highly dependent on the manufacturing of the sensors since they must be precisely manufactured and oriented at 45° relative to one another, in order to minimize errors in the output of the system. Because such precision is required in manufacturing and assembling these sensors and the magnets, manufacturing irregularities may result in errors in the output of the device.

Therefore, there is a need in the art for a contactless angular measurement device which is relatively low cost yet remains accurate throughout the life of the device. The device should account for manufacturing irregularities, system aging and thermally induced drifts within the sensor device in order to maintain an accurate reading over the life of the device.

SUMMARY OF THE INVENTION

The present invention is intended to provide a low cost contactless angular measurement system for use in determining a linear movement of a component of a vehicle by measuring a corresponding rotational movement of a magnetic element that is interconnected with the component.

According to a first aspect of the invention, a vehicular magnetic rotational measurement device for determining a displacement of an element comprises a magnetic element which generates a magnetic field, at least one magnetoresponsive sensor for sensing the magnetic field generated by the magnetic element, and an electronic control for analyzing an output of the sensor and determining a degree of movement of the magnetic element relative to the sensor from the output of the sensor. The magnetic element is spaced from the magnetoresponsive sensor and is movable relative thereto. The sensor is operable to detect a change in the magnetic field of the magnetic element which is associated with a movement of the magnetic element relative to the magnetoresponsive sensor. The electronic control is operable to determine an offset in the output of the sensor and adjusts an output of the electronic control in response to this offset.

According to another aspect of the present invention, a magnetic level sensor is adapted for interconnection with a generally linearly movable component of the vehicle. The level sensor determines an orientation of the component relative to a frame of the vehicle and comprises a magnetic element, at least one magnetoresponsive sensor for sensing a magnetic field generated by the magnetic element, and an electronic control which is operable to analyze an output of the sensor and determine an angle of rotation of the magnetic element or the sensor in response to the output of the sensor. The magnetic element is spaced from the magnetoresponsive sensor and is rotatable relative thereto. The sensor is operable to detect a change in the magnetic field of the magnetic element which is associated with a rotational movement of the magnetic element relative to the sensor. The magnetic element or the sensor is rotatably interconnected to the component of the vehicle such that a generally linear displacement of the component causes a corresponding angular rotation of the magnetic element or the magnetoresponsive sensor. The electronic control is operable to determine an offset in the output of the sensor and adjust an output of the electronic control in response to the offset.

Preferably, the offset is determined in response to an average ordinate value of equal and opposite pairs of data points sampled by the electronic control. The control may initially determine the offset when the vehicle or control is started, or may continuously determine the offset and adjust the output accordingly.

These and other objects, advantages, purposes and features of this invention will become apparent upon review of the following specification in conjunction with the drawings.

DESCRIPTION OF THE PREFERRED EMBODIMENTS

Figure 1:
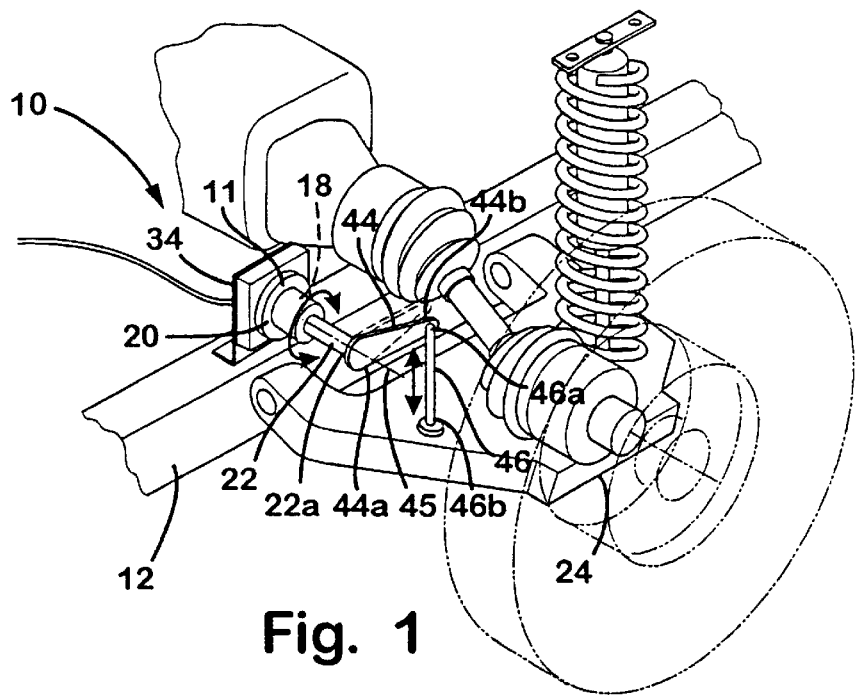
FIG. 1 is a perspective view of a magnetic level sensor according to the present invention illustrated interconnected between a chassis of a vehicle and a control arm of the vehicle and operable to determine a vertical displacement of the control arm of the vehicle.

Referring now specifically to the drawings, and the illustrative embodiments depicted therein, there is shown in FIG. 1 a magnetic level sensor 10 which comprises a magnetic angular measurement device 11 secured to a chassis or frame 12 of a vehicle 14. Angular measurement device 11 preferably comprises two magnetoresponsive sensors 16 (FIG. 2) and a magnetic element 18 spaced from the sensors 14. Magnetoresponsive sensors 16 may be a magnetoresistive, magnetoinductive, magnetocapacitive or flux gate type sensor. Sensors 16 are secured within a housing 20 which is preferably secured to the chassis 12 of vehicle 14, while magnetic element 18 may be secured to an end of a rod or shaft 22 which is preferably pivotally or rotatably interconnected with a movable component of vehicle 14, such as a corner assembly 24, such that vertical movement of corner assembly 24 is translated to a rotational movement of shaft or spindle 22 and magnetic element 18. However, magnetic element 18 may be mounted at the chassis while the sensors 16 are mounted at the control assembly, or one of the components may be mounted at any other movable element of the vehicle, such as a suspension element or the like, which is movable relative to the frame or chassis of the vehicle in response to a change in load of the vehicle, without affecting the scope of the present invention. Level sensor 10 further comprises an electronic control or microcontroller 26 (FIG. 4) which analyzes an output of the sensors 16 to determine the degree of movement and/or angle of rotation of magnetic element 18 relative to the sensors 16, and thus the corresponding vertical displacement of the corner assembly 24 relative to the chassis 12 of vehicle 14. Microcontroller 26 further analyzes the output of sensors 16 and determines if there is an offset or error in the output. Microcontroller 26 preferably includes a processor, such as a microcomputer or microprocessor, which is operable to calculate the offset in the output. If an offset exists, the microcontroller 26 adjusts an output of microcontroller 26 in a manner to substantially cancel the offset in order to provide an accurate level measurement to a display, auxiliary control or the like. The microcontroller programmed in this manner provides a calibration system for magnetic measurement device 11.

The magnetic measurement device associated with the present invention is preferably a commercially available device, such as a Phillips KMZ-41 magnetoresistive sensor described in Philips data book #SC-17, which is hereby incorporated herein by reference, or a Honeywell HCS-1512 sensor, or other sensor devices which determine a relative angular rotation between a magnetic element and at least one magnetoresponsive sensor. This relative rotation may be provided by rotating the magnetic element while the sensors are substantially fixed, or by rotating the sensors relative to a substantially fixed magnetic element. By implementing a calibration process with the angular measurement devices, these devices may be manufactured using lower cost magnetic elements and may also allow for elimination of certain manufacturing processes, such as laser trimming of the sensors and the like. Furthermore, the present invention corrects for offsets or errors due to manufacturing irregularities and due to any magnetic drift associated with the age of the magnetic element or sensors or with temperature variations surrounding the device.

Figure 3:
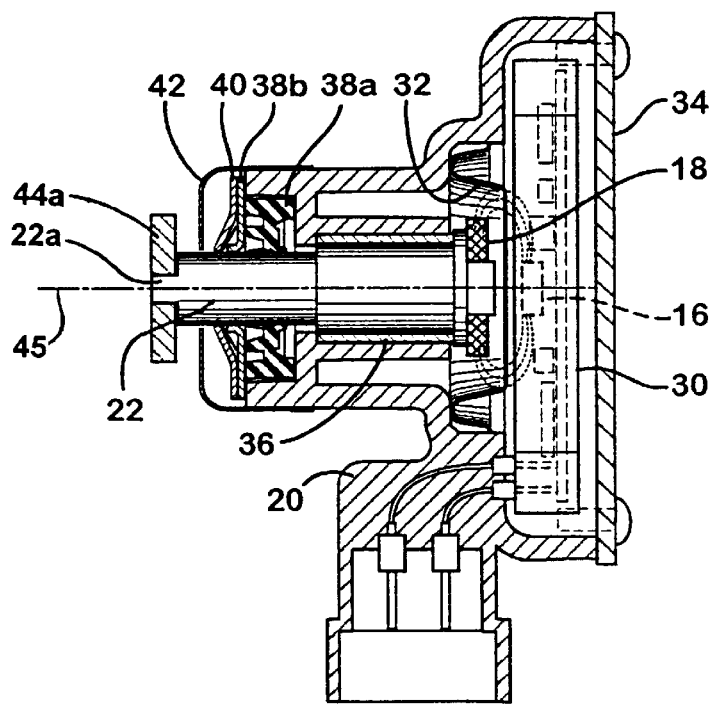
FIG. 3 is a cross-sectional view of the contactless angular measurement device of FIG. 2 in its assembled state.
Figure 2:
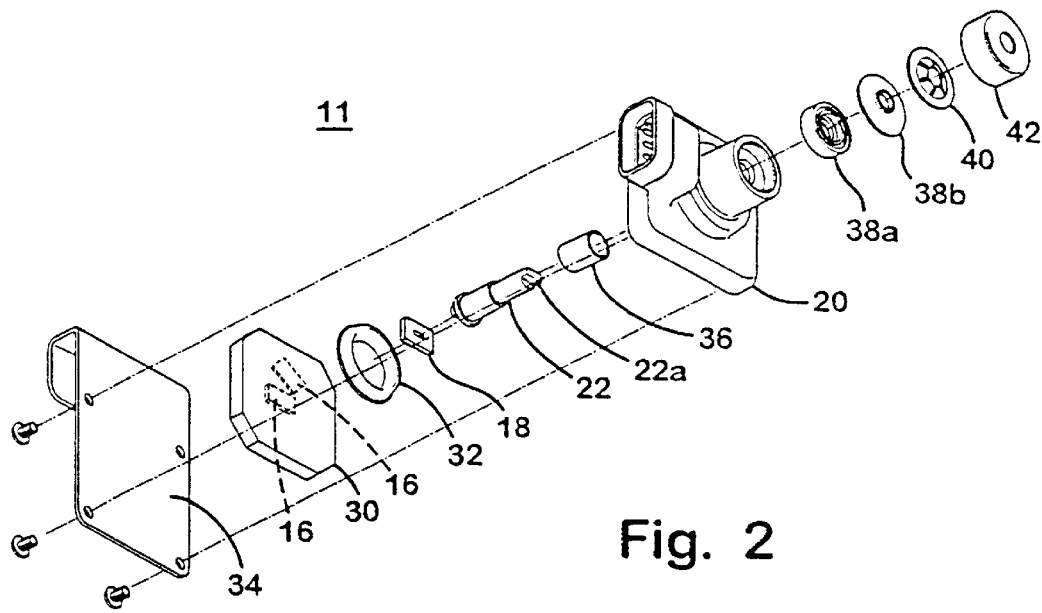
FIG. 2 is an exploded view of a contactless angular measurement device useful with the present invention.

As best shown in FIGS. 2 and 3, housing 20 of magnetic angular measurement device 11 substantially encases magnetoresponsive sensors 16, which are mounted on a circuit board 30, magnetic element 18, which is secured at one end to shaft 22, and a barrier seal 32 positioned between the sensors 16 and magnet 18. A mounting bracket 34 is attached to housing 20 and is adapted to secure housing 20 to the chassis or frame 12 of the vehicle 14. When assembled, as shown in FIG. 3, shaft 22 extends through a bushing 36 and protrudes outwardly from housing 20. Shaft 22 preferably further extends through a pair of seals 38a and 38b, which prevent water or other contaminants from entering into housing 20, and is secured by a clip 40 which is attached to shaft 22 in order to prevent longitudinal movement of shaft 22 relative to housing 20 and sensors 16. A cap 42 is also included to protect the clip 40 and shaft 22 from damage and exposure to water, dirt and other contaminants. The details of the internal components of measurement device 11 are not included herein since these are known devices which are commercially available.

When implemented on vehicle 14, shaft 22 of measurement device 11 preferably includes a narrowed or flattened portion 22a (FIG. 2) formed at an outward end for interconnection with a shaft end 44a of an arm or lever 44 (FIG. 1), such that arm 44 pivots about an axis 45 defined by shaft 22, which results in a pivoting or rotation of shaft 22, and thus magnet 18, relative to sensors 16. An end 44b of arm 44 opposite shaft end 44a may be pivotally interconnected with an upper end 46a of a substantially vertical member 46, which is preferably secured at its lower end 46b to control arm 24 of vehicle 14, or to another linearly or movable component of vehicle 14. Preferably, arm 44 and vertical member 46 are pivotally interconnected through a ball and socket joint, such that vertical movement of vertical member 46 correspondingly moves end 44b of arm 44 vertically, which results in arm 44 pivoting about end 44a and axis 45. Therefore, vertical movement of the corner assembly 24 is effectively translated into a rotational movement of shaft 22 and magnetic element 18 relative to the substantially fixed magnetoresponsive sensors 16 of level sensor 10. Although shown and described as attaching between a frame 12 and the control arm or corner assembly 24, level sensor 10 may alternatively be interconnected with other linearly moving components, such as a suspension unit or the like, whereby a substantially linear displacement is translated into a rotational movement of shaft 22.

Figure 6:
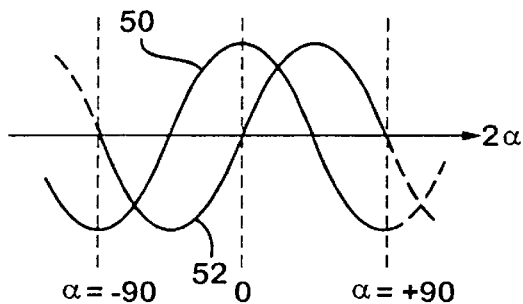
FIG. 6 is an illustration of a sine and cosine output of the two magnetoresponsive sensors implemented in a level sensor device useful with the present invention.

As magnet 18 is rotated, the angle of its external magnetic field changes relative to an internal magnetic field of sensors 16, which causes an internal magnetization vector to also rotate in order to align itself with the external field. As shown in FIG. 2, the two magnetoresponsive sensors 16 are positioned at 45° relative to one another, which results in their output signals associated with a rotation of the magnet 18 being a sine wave 50 and cosine wave 52, or 90° out of phase from each other (FIG. 6). These output waves may be plotted on a Cartesian coordinate system 54 (FIG. 7) so as to trace a substantially circular pattern 56 representing the rotation of magnet 18 relative to sensors 16. Because sensors 16 are typically saturated by the external magnetic field of magnet 18, the output frequency of sensors 16 is doubled such that the outputs of sensors 16 are sine and cosine waves of twice the angle of rotation of magnet 18 (sin 2α and cos 2α, where α is the angle of rotation of magnet 18 relative to sensors 16) which results in a 180° rotation of magnet 18 relative to sensors 16 generating a full cycle of the sine and cosine output signals of magnetoresponsive sensors 16. This allows angular measurement device 11 to accurately determine the angle of rotation of shaft 22 and magnet 18 within a range of only 180°, or plus or minus 90° from an initial reference point. However, it is further envisioned that the present invention may be equally applicable to a 360° rotational device, and thus determine relative rotation between vehicular components, such as steering angle positions, or the like, or any other application where it is desired to know a shaft angle of rotation, as well as quasi-linear relative movement.

Because the rotation of shaft 22 cannot physically be greater than 180° in response to a substantially linear displacement of vertical member 46, implementation of the commercially available angular measurement device 11 is appropriate in order for level sensor 10 to accurately determine the angular rotation of shaft 22. Once the angular rotation of shaft 22 is known, vertical displacement of the control arm 24 may be easily calculated, knowing the length of lever arm 44. For example, with a length L of lever arm 44, any rotational measurement (α) of shaft 22 from an initial reference point results in a calculated vertical displacement of Lsin α.

Microcontroller 26 is operable to analyze the output of magnetoresponsive sensors 16 in order to determine the angular rotation of magnet 18 relative to sensors 16. For any given angular rotation (α) of magnet 18 relative to sensors 16, sensors 16 measure the sine and cosine of twice that angle. As is known in the art, the angle of rotation α may then be determined by solving the equation $$\tan 2\alpha = \frac{\sin 2\alpha}{\cos 2\alpha}$$

for α, as sin 2α and cos 2α are the values measured by the two sensors.

Figure 7:
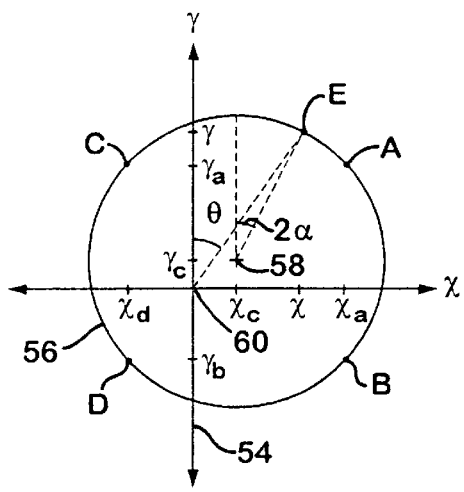
FIG. 7 is a diagram of the sensor outputs of FIG. 6 as they are plotted in a Cartesian coordinate system.

Referring now to FIG. 7, when the values of sine wave 50 and cosine wave 52 are plotted on a Cartesian coordinate system 54 associated with the vehicle 14, a generally circular path or trace 56 is formed which represents a 180° rotation of magnet 18 relative to sensors 16. However, due to irregularities in the manufacturing processes of the angular measurement devices, or with changes in the magnetic fields associated with either magnet 18 or sensors 16, the output of magnetoresponsive sensors 16 may be offset from zero or may deviate from an accurate reading. This is represented in FIG. 7 by the circle 56 being shifted, such as upward and to the right, from a center or origin 60 of coordinate system 54 associated with magnetoresponsive sensors 16 and vehicle 14, such that a center 58 of the circle 56 is displaced from the origin 60. Previous attempts at reducing such a drift or offset have included using high cost sensors and magnets and further requiring extremely precise manufacturing tolerances, such that the error or offset of the output of sensors 16 is minimized both at the time of manufacturing and over the useful life of the device. However, the present invention avoids these high cost requirements by implementing microcontroller 26, which samples data points as magnet 18 is rotated and provides an algorithm for adjusting the output of sensors 16 in order to account for this error.

Preferably, algorithm 100 (FIG. 8) of microcontroller 26 samples data points as magnet 18 is rotated until an equal and opposite pair or set of data points is collected, where an equal pair is defined by a pair of data points having a common x or y component of their coordinates relative to coordinate system 54. More specifically, if a first sampled data point A has the coordinates $(x_a, y_a)$, the system continues to sample data points until a second data point B or C, having coordinates $(x_a, y_b)$ or $(x_b, y_a)$, respectively, is also collected. Once a pair of data points (A and B or A and C) has been collected, the center or initial zero reference of the circle 56 relative to the uncommon or opposite ordinates of the data points may be easily calculated by averaging those ordinates. Microcontroller 26 then continues to sample data points until a second pair of data points is collected which includes a new data point which is equal and opposite to one of the previously collected data points. For example, if the first data point collected A has the coordinates $(x_a, y_a)$, then the system may continue to monitor the output until a second data point B, having coordinates $(x_a, y_b)$, is also collected. At this point, the ordinate $y_c$, corresponding to a y value of the center 58 of circle 56, may be calculated by averaging the uncommon ordinates $y_a$ and $y_b$ of the two data points collected. Microcontroller 26 may continue to monitor sensors 16 until a third data point D, which may have coordinates ($x_d$, $y_b$), is also collected. Microcontroller 26 may then determine the other ordinate ($x_c$) of the center 58 of circle 56 by averaging the x components ($x_d$ and $x_a$) of the second pair of data points. At this point the x and y values of the true center ($x_c$, $y_c$) of the output of magnetoresponsive sensors 16 is known. The data points collected by microcontroller 26 may be sampled at any point about the circular trace. Preferably, microcontroller 26 is operable to first determine whether the values of the data points are a predetermined minimum value apart from one another prior to averaging their ordinates, in order to minimize noise effects on the system.

Once the true center ($x_c$, $y_c$) is known, the offset may easily be accounted for. As magnet 18 rotates relative to the sensors 16, additional data points, such as E, having coordinates (x, y) may be sampled. As shown in FIG. 7, without accounting for the offset of the center of the circular trace, this data point E provides an error reading as microcontroller reads its angle of rotation relative to the y axis to be an angle $\theta/2$, while its true rotation relative to sensors 16 is the angle $\alpha$. Microcontroller 26 corrects for this error by subtracting the x and y components of the calculated center ($x_c$, $y_c$) from the respective components of the newly sampled data point E (x, y), and then determining the correct angle of rotation. This is easily accomplished by solving for the arctangent of $[(x-x_c)/(y-y_c)]$ which results in the angle of rotation $\alpha$, thereby providing a simple mathematical correction of the output of sensors 16 while also requiring a minimal amount of data points to be sampled and stored at any given time. Microcontroller 26 of the present invention continues to sample data points and collect equal pairs of data points in order to continuously calibrate or adjust the output of sensors 16 to maintain an accurate reading of the rotation of magnet 18. By requiring a minimum difference in magnitude of a valid pair of data points, microcontroller 26 only adjusts the output of sensors 16 in response to a pair of data points that have substantially different magnitudes of at least one ordinate. This substantially precludes the likelihood of incorrectly adjusting the output of sensors 16 in response to mere noise in the system.

Figure 8:
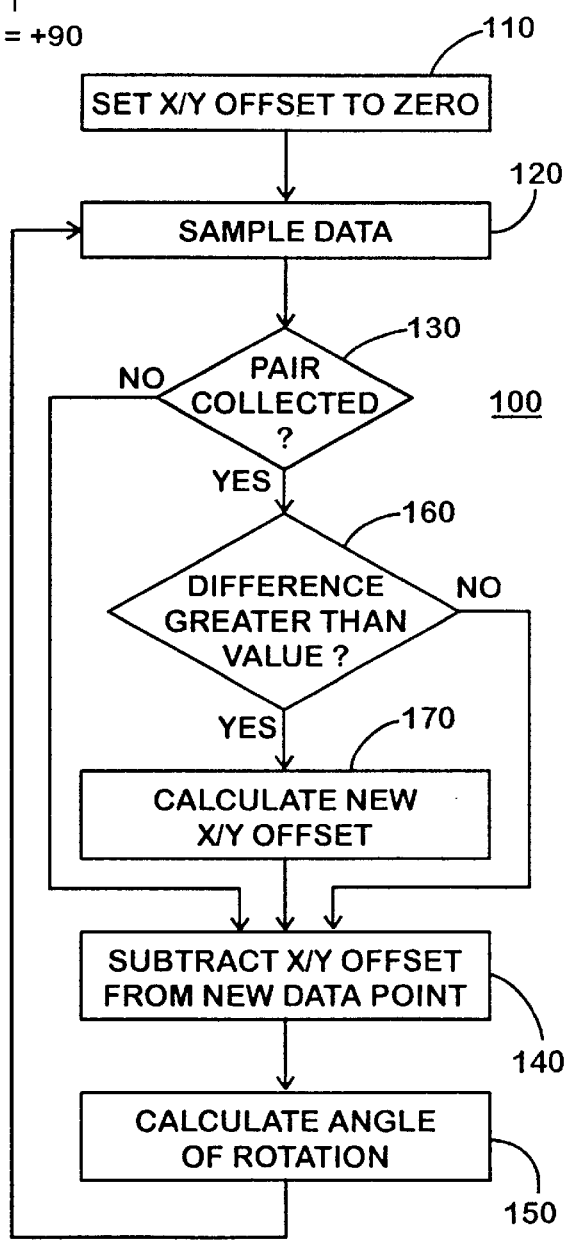
FIG. 8 is a flow chart of a calibration process according to the present invention for use with an angular measurement device.

As shown in FIG. 8, calibration algorithm 100 of microcontroller 26 starts at 110 by setting both the x and y offsets to zero, or, in other words, setting the $x_c$ and $y_c$ values to zero. Data points are then sampled at 120. It is then determined at 130 whether a pair of equal and opposite points have been sampled by microcontroller 26. If a new pair has not been collected, algorithm 100 subtracts the x and y offset from the newly sampled data point at 140. The angle of rotation is then determined at 150 by solving the arctangent equation discussed above. Algorithm 100 then returns to sampling data at 120. If it is determined at 130 that a pair has been collected, it is then determined at 160 whether the difference between the magnitudes of the uncommon ordinates is greater than a predetermined value. This minimum difference value is selected in order to adjust only the offset value when there is a significant difference between the two points, thereby avoiding resetting the offset value when the difference between the points may be substantially or entirely due to noise in the system. If it is determined at 160 that the difference is not greater than the predetermined value, then the x and y offset is subtracted from the new data point at 140 and the angle of rotation is calculated at 150 before algorithm 100 returns to sampling data at 120. On the other hand, if it is determined at 160 that a valid pair has been collected, a new x or y offset is calculated at 170 by averaging the appropriate opposite ordinates of the valid pair. The x and y offsets are then subtracted from the new data point at 140 and the angle of rotation is calculated at 150. Algorithm 100 then returns to sampling data at 120.

Figure 4:
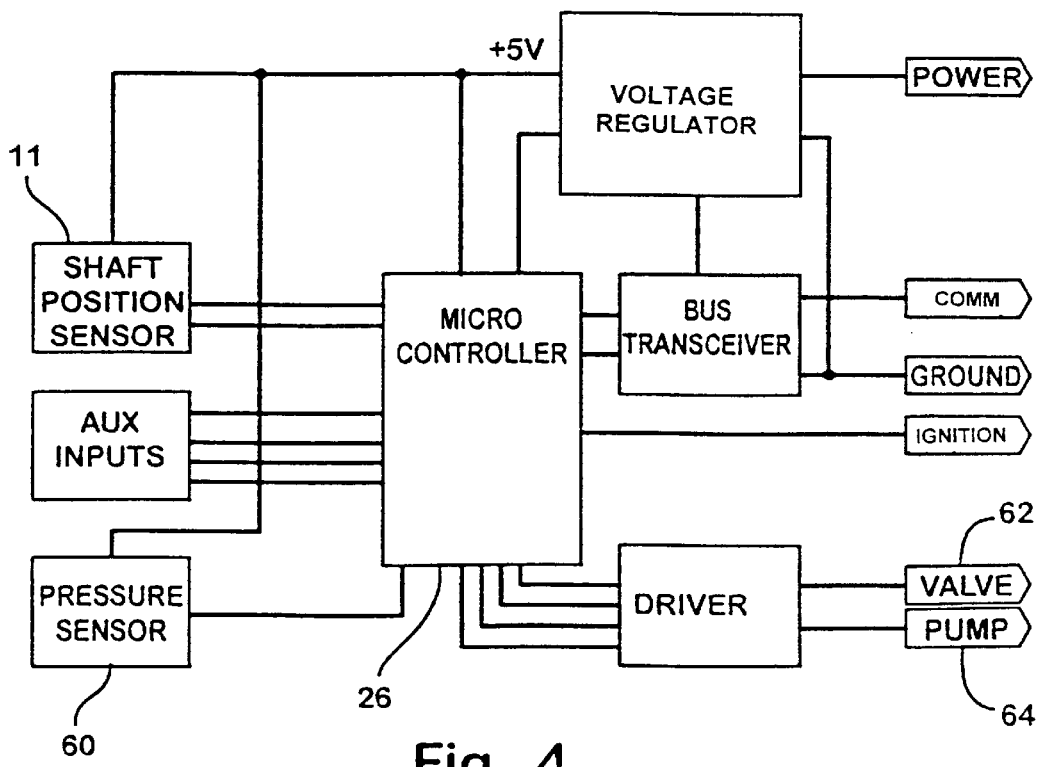
FIG. 4 is a block diagram of an application of the present invention.
Figure 5:
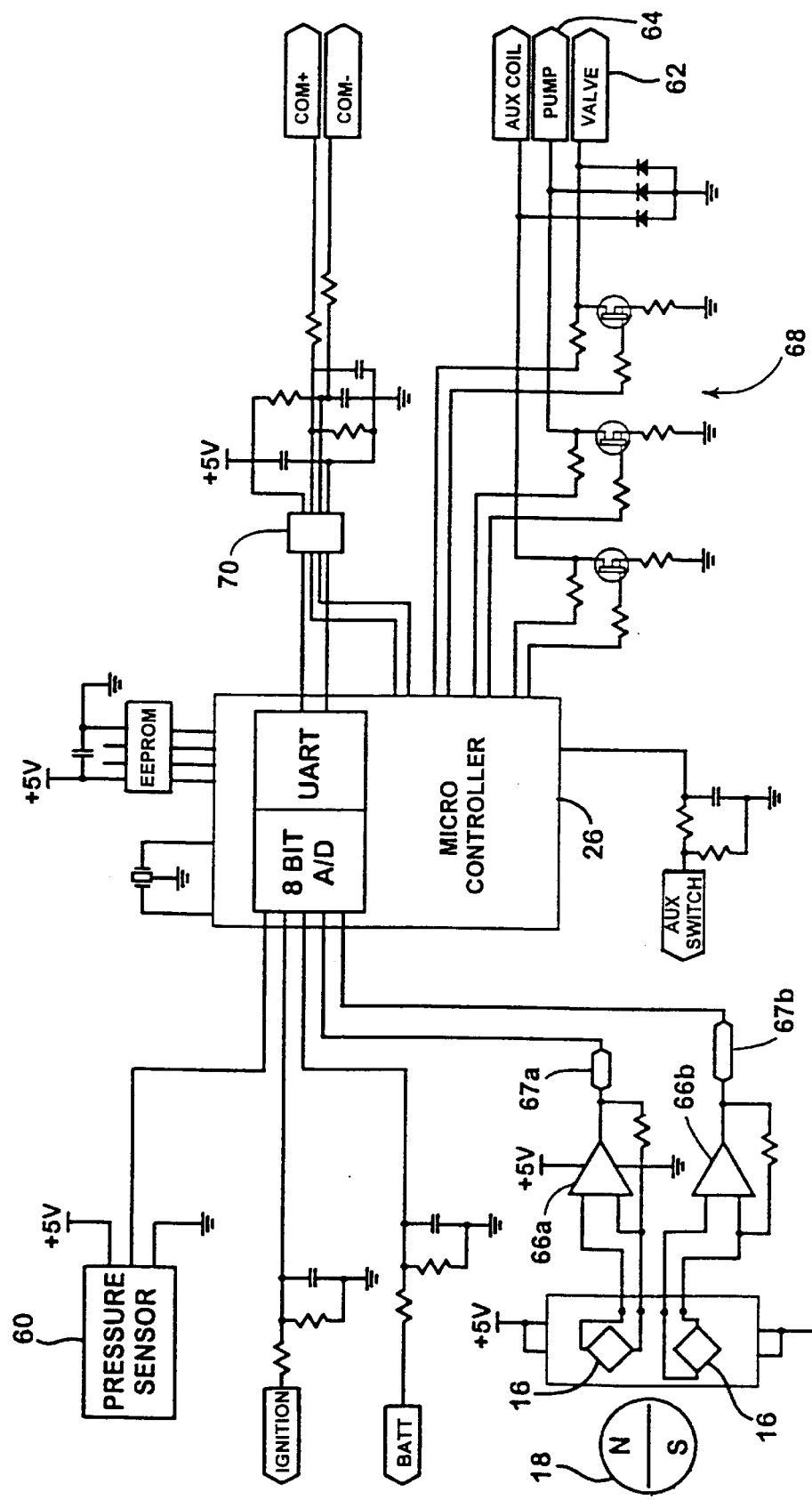
FIG. 5 is a schematic illustrating the electronic circuit of the present invention.

Referring now to FIGS. 4 and 5, magnetic level sensor 10 is preferably interconnected with a pressure sensor 60, a valve 62 and a pump 64, each of which is associated with a suspension device or unit, such as an air shock or the like. As angular measurement device 11 monitors the angular rotation of magnet 18 via sensors 16, the rotational movement of magnet 18 is communicated to microcontroller 26. A pair of operational amplifiers 66a and 66b are operable to generate sine and cosine signals 67a and 67b, respectively, to microcontroller 26. The corresponding vertical displacement of the vehicle component 24 may then be easily determined in response to the sine and cosine signals, as discussed above. When this vertical movement is greater than a predetermined value from a level reference point, microcontroller 26 may further function to inflate or deflate or bleed the air shocks of vehicle 14 by activating pump 64 or valve 62, respectively, via corresponding solenoids 68. This activation continues until vehicle 14 is brought back within the predetermined range of level. Pump 64 and valve 62 are used to inflate and deflate the air shocks, respectively, and are preferably not activated unless microcontroller 26 determines that vehicle 14 is outside of the predetermined range level for a prolonged period of time. This avoids continuous inflation and deflation of the air shocks as vehicle 14 is being driven and the control arm 24 or other component is moving vertically upwardly and downwardly in response to rough road conditions. Preferably, microcontroller 26 is further operable to communicate with other vehicle systems via a communication driver 70, and may be adapted to communicate using various protocols for different vehicle applications of the present invention.

Although shown and described as sampling for equal and opposite pairs of data points and adjusting the output of sensors 16 accordingly, microcontroller 26 may provide alternate algorithms for analyzing the output of sensors 16 and adjusting the output to account for any offset that may occur over time. For example, the algorithm may sample maximum and minimum values of the sine and cosine waves and determine the offset or center by averaging the peaks and valleys of the respective waves. Other forms of calibrating a magnetoresponsive sensor output are known in the field of magnetic compasses for vehicles, such as the compass compensation systems disclosed in commonly assigned U.S. Pat. Nos. 5,255,442, 5,644,851, 5,632,092 and 5,802,727, each of which is hereby incorporated herein by reference. While such compensation systems have been applied to vehicle compasses, there has been no application of any compensation system for a magnetic angular measurement device, nor has there been any suggestion in the art to apply such compensation systems to such a device. Calibration systems have not been applied to such angular measurement devices because these devices have historically been manufactured with precision components and processes, such that the offsets or errors associated with the magnets and the sensors are minimized during manufacturing of the devices. However, by applying the concepts of a compass compensation system to an angular measurement device, a lower cost angular measurement device may be manufactured which will provide an accurate output after manufacturing and will continue to provide an accurate output throughout the life of the device.

In contrast to a vehicle compass system, the magnetic angular measurement devices useful with the present invention do not require a presetting or biasing of the sensors prior to applying a compass calibration system thereto. This is because the magnetic angular measurement device or system is only effected by electrically induced offsets in the sensors and not with any magnetic induced offsets due to the vehicle or its surroundings. Accordingly, the calibration system of the present invention may be implemented with an angular measurement device without first having to preset a magnetic signature of the vehicle or other surroundings of the device. While magnetic induced offsets from the vehicle metal and other electronics may affect the angular measurement devices, its effect would be minimal compared to the electrically induced offsets of the sensors and magnet itself. Any of these minor offsets are further minimized as the algorithm of the present invention adjusts the output in response thereto.

Magnetic level sensor 10 of the present invention may also be interconnected with a vehicle security system or device which detects movement of the vehicle when the level sensor is not typically active, such as when the ignition has not been activated. The security system preferably senses or interrogates the level sensor periodically while the ignition is off. If the level of the vehicle or orientation of the magnet and sensors relative to one another changes while the ignition is not activated, then the security system determines that the vehicle is being tampered with, such as being towed or otherwise hauled away. The security system may then activate an alarm or signal or may transmit a communication to a predetermined receiving device in response to this determination. This communication may be interconnected with a police tracking system and/or with a Global Positioning System in order to convey the new vehicle location to the recipient of the message.

The security system may alternatively be interconnected with a compass system, such as of the type disclosed in commonly assigned provisional patent application, Serial No. 60/128,262, filed Apr. 8, 1999 by Eric Hoekstra et al., the disclosure of which is hereby incorporated herein by reference. The security system may sense or monitor the leveling device and/or the compass when the ignition is in an off position. If the signal from the compass or measuring device changes while the vehicle is off, the security sensor then determines that the vehicle is being tampered with or otherwise being moved or towed away. As discussed above, the security system then may activate an alarm or communicate a signal or message in response to this determination.

Although described as monitoring a compass system or a leveling system, the security system discussed above may alternately monitor or interrogate other devices or systems associated with the vehicle that are normally used or activated only when the vehicle is running. The security system monitors these devices when the vehicle is off to determine if the vehicle is being tampered with or moved. For example, the security system may monitor a wheel speed sensor, a transmission park sensor, a steering wheel or front wheel turning sensor or any other sensor or device that is not typically moved, activated or changed after a vehicle is parked and the ignition is turned off. Detection of motion or change in these types of devices when the ignition is off is generally a sign that the vehicle is being tampered with by someone other than the owner of the vehicle. Therefore, the security system would activate an alarm or signal in response to such a detection.

The level sensor disclosed herein can also be useful with an outdoor temperature monitor. Such temperature monitors typically read a parameter of a temperature probe, mounted to sense exterior temperature, after a particular interval. The interval is selected to avoid preemption of other functions performed by the processor. Such interval is usually adequate when the vehicle is moving. However, when a vehicle sits in a garage or in the sun, the temperature sensed by the exterior temperature sensor may be in error when a vehicle begins movement. The level sensor can be used to signal the processor that the vehicle has begun moving. The processor can then take one or more immediate samplings of the temperature sensor to update the reading during such transient situations. The processor may also be operable to take one or more immediate samplings of the temperature sensor in response to changes in a compass system as well. Other situations where the ability of a level sensor or a heading sensor (such as a compass system) to determine vehicle movement can provide useful information, both when the vehicle is running and not running, will be apparent to the skilled artisan.

Therefore, the present invention provides an angular measurement device which may be automatically and continuously calibrated throughout the life of the device, thereby providing an accurate output of the magnetoresponsive sensors within the device. Such a device is used as a leveling device to detect when the vehicle is not in a level orientation, such as when the vehicle is towing a load. The leveling device preferably includes a substantially vertical or horizontal lever interconnected with a potentiometer or other measuring device. The measuring device includes a magnetoresponsive sensor which senses a relative movement or angular rotation of a magnetic element rotatably interconnected to a portion of the vehicle suspension. A display may also convey a degree of tilt of the vehicle to a driver or occupant of the vehicle or an adjustable suspension may be adjusted in response to a predetermined amount of tilt to counter the tilt and level the vehicle. For example, air may be supplied to or extracted from an air suspension unit to raise or lower a portion of the vehicle in order to level the vehicle.

Preferably, the angular measurement device is implemented for use in a magnetic level sensor which is adapted for use in a vehicle in order to determine a vertical movement of a suspension unit on the vehicle. The microcontroller and compensation algorithm of the present invention further allows for a low cost angular measurement device to be implemented with the magnetic level sensor of the vehicle. More particularly, by implementing a calibration system for an angular measurement device, the output of the magnetoresponsive sensors may be adjusted in response to a drift in the signal due to aging of the magnetic element, temperature variations surrounding the device, or other variations which may influence the output of the magnetoresponsive sensors. This allows the angular measurement device to be manufactured with lower cost magnets and substantially eliminates the need for laser trimming of the magnetoresponsive sensors. Furthermore, calibration of the magnetoresponsive sensors in accordance with changes either to the sensors or to the magnet allows these devices to be manufactured under a broader range of tolerances associated with the parts and the manufacturing processes. The end result of implementing a calibration system with the angular measurement device is a lower cost, robust magnetic angular measurement device which may be adapted for use on a vehicle.

Changes and modifications in the specifically described embodiments can be carried out without departing from the principles of the invention, which is intended to be limited only by the scope of the appended claims, as interpreted according to the principles of patent law.

The embodiments of the invention in which an exclusive property rights or privilege is claimed are defined as follows:

1. A vehicular magnetic device for determining a displacement of an element of a vehicle via a measured displacement, said magnetic device comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor being operable to detect a change in the magnetic field associated with a movement of said magnetic element relative to said at least one magnetoresponsive sensor; and an electronic control which is operable to analyze an output of said at least one magnetoresponsive sensor and determine a degree of movement of said magnetic element relative to said at least one magnetoresponsive sensor from the output of said at least one magnetoresponsive sensor, said electronic control being further operable to determine an offset in the output of said at least one magnetoresponsive sensor and adjust a control output of said electronic control as a function of the offset, wherein said electronic control is operable to determine the offset by sampling at least two data points and averaging corresponding values associated with each of said at least two data points.

2. The vehicular magnetic device of claim 1, wherein said electronic control is operable to continuously monitor and adjust the output of said at least one magnetoresponsive sensor.

3. The vehicular magnetic device of claim 1, wherein said at least one magnetoresponsive sensor comprises at least one of a magnetoresistive sensor, a magnetoinductive sensor, a magnetocapacitive sensor and a flux gate sensor.

4. The vehicular magnetic device of claim 1, wherein said at least one magnetoresponsive sensor includes two magnetoresponsive sensors oriented at a predetermined angle relative to one another.

5. The vehicular magnetic device of claim 4, wherein said two magnetoresponsive sensors are oriented at approximately a 45 degree angle relative to one another.

6. The vehicular magnetic device of claim 1, wherein said at least one magnetoresponsive sensor is saturated by the external magnetic field of said magnetic element.

7. The vehicular magnetic device of claim 1, wherein said electronic control is operable to sample at least one equal and opposite pair of data points and average an opposite component of each data point.

8. The vehicular magnetic device of claim 1, wherein the output of said at least one magnetoresponsive sensor is associated with a coordinate system associated with one of said at least one magnetoresponsive sensor and said magnetic element, the coordinate system being defined by data points having first and second ordinates, the at least two data points comprising one common ordinate and one uncommon ordinate, the corresponding values being ordinate values of the uncommon ordinates.

9. A vehicular magnetic device for determining a displacement of an element of a vehicle via a measured displacement, said magnetic device comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor being operable to detect a change in the magnetic field associated with a movement of said magnetic element relative to said at least one magnetoresponsive sensor; and an electronic control which is operable to analyze an output of said at least one magnetoresponsive sensor and determine a degree of movement of said magnetic element relative to said at least one magnetoresponsive sensor from the output of said at least one magnetoresponsive sensor, said electronic control being further operable to determine an offset in the output of said at least one magnetoresponsive sensor and adjust a control output of said electronic control as a function of the offset, wherein the output of said at least one magnetoresponsive sensor is associated with a coordinate system associated with one of said at least one magnetoresponsive sensor and said magnetic element, the coordinate system being defined by data points having a first and second ordinate, said electronic control being operable to sample data points and determine the offset in response to the data points.

10. The vehicular magnetic device of claim 9, wherein said control is operable to sample a first data point and a second data point, each of the first and second data points comprising a common ordinate and an uncommon ordinate, said control being operable to average the uncommon ordinates to determine an approximate first ordinate of the offset.

11. The vehicular magnetic device of claim 10, wherein said control is operable to sample a third data point which comprises a third uncommon ordinate and a third common ordinate which is approximately equal to one of the uncommon ordinates of the first and second data points, said control being operable to average the third uncommon ordinate with a corresponding one of the common ordinates of the first and second data points to determine an approximate second ordinate of the offset.

12. The vehicular magnetic device of claim 11, wherein said control is operable to sample additional data points, said control subtracting the first and second ordinates of the offset from the respective ordinate values of the additional data points to account for the offset.

13. A vehicular magnetic device for determining a displacement of an element of a vehicle via a measured displacement, said magnetic device comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor being operable to detect a change in the magnetic field associated with a movement of said magnetic element relative to said at least one magnetoresponsive sensor; and an electronic control which is operable to analyze an output of said at least one magnetoresponsive sensor and determine a degree of movement of said magnetic element relative to said at least one magnetoresponsive sensor from the output of said at least one magnetoresponsive sensor, said electronic control being further operable to determine an offset in the output of said at least one magnetoresponsive sensor and adjust a control output of said electronic control as a function of the offset, wherein one of said magnetic element and said at least one magnetoresponsive sensor is positioned at a movable element of the vehicle and the other of said magnetic element and said at least one magnetoresponsive sensor is positioned at a frame member of the vehicle.

14. The vehicular magnetic device of claim 13, wherein said one of said magnetic element and said at least one magnetoresponsive sensor is pivotally mounted at the movable element such that substantially linear movement of the movable element relative to the frame member is translated into rotational movement of said one of said magnetic element and said at least one magnetoresponsive sensor relative to said other of said magnetic element and said at least one magnetoresponsive sensor.

15. A vehicular magnetic device for determining a displacement of an element of a vehicle via a measured displacement, said magnetic device comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor being operable to detect a change in the magnetic field associated with a movement of said magnetic element relative to said at least one magnetoresponsive sensor; and an electronic control which is operable to analyze an output of said at least one magnetoresponsive sensor and determine a degree of movement of said magnetic element relative to said at least one magnetoresponsive sensor from the output of said at least one magnetoresponsive sensor, said electronic control being further operable to determine an offset in the output of said at least one magnetoresponsive sensor and adjust a control output of said electronic control as a function of the offset, wherein said magnetic element is rotatable relative to said at least one magnetoresponsive sensor, said electronic control being operable to determine an angle of rotation of said magnetic element relative to said at least one magnetoresponsive sensor.

16. A vehicular magnetic device for determining a displacement of an element of a vehicle via a measured displacement, said magnetic device comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor being operable to detect a change in the magnetic field associated with a movement of said magnetic element relative to said at least one magnetoresponsive sensor; and an electronic control which is operable to analyze an output of said at least one magnetoresponsive sensor and determine a degree of movement of said magnetic element relative to said at least one magnetoresponsive sensor from the output of said at least one magnetoresponsive sensor, said electronic control being further operable to determine an offset in the output of said at least one magnetoresponsive sensor and adjust a control output of said electronic control as a function of the offset, wherein said control includes a processor which is operable to calculate the offset in the output of said at least one magnetoresponsive sensor.

17. A vehicular magnetic level sensor adapted for interconnecting with a generally linearly movable component on a vehicle, said level sensor being operable to determine an orientation of the movable component relative to a frame member of the vehicle and comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor detecting a change in the magnetic field associated with a movement of said magnetic element relative to said at least one magnetoresponsive sensor, one of said magnetic element and said at least one magnetoresponsive sensor being interconnected to the component of the vehicle such that a generally linear movement of the movable component causes a corresponding movement of said one of said magnetic element and said at least one magnetoresponsive sensor relative to the other of said magnetic element and said at least one magnetoresponsive sensor; and an electronic control for analyzing an output of said at least one magnetoresponsive sensor and determining a degree of movement of said one of said magnetic element and said at least one magnetoresponsive sensor in response to the output of said at least one magnetoresponsive sensor, said electronic control being operable to determine an offset in the output of said at least one magnetoresponsive sensor and adjust an output of said electronic control as a function of the offset, wherein the movable component is one of a control arm and a suspension unit and said generally linear movement is a generally vertical movement of one of the control arm and the suspension unit relative to the frame member of the vehicle.

18. The vehicular magnetic level sensor of claim 17, wherein said electronic control is operable to activate at least one of a pump and a valve in response to the output of said at least one magnetoresponsive sensor, at least one of the pump and the valve being operable to adjust a suspension device of the vehicle.

19. A vehicular magnetic level sensor adapted for interconnecting with a generally linearly movable component on a vehicle, said level sensor being operable to determine an orientation of the movable component relative to a frame member of the vehicle and comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor detecting a change in the magnetic field associated with a movement of said magnetic element relative to said at least one magnetoresponsive sensor, one of said magnetic element and said at least one magnetoresponsive sensor being interconnected to the component of the vehicle such that a generally linear displacement of the movable component causes a corresponding movement of said one of said magnetic element and said at least one magnetoresponsive sensor relative to the other of said magnetic element and said at least one magnetoresponsive sensor; and an electronic control for analyzing an output of said at least one magnetoresponsive sensor and determining a degree of movement of said one of said magnetic element and said at least one magnetoresponsive sensor in response to the output of said at least one magnetoresponsive sensor, said electronic control being operable to determine an offset in the output of said at least one magnetoresponsive sensor and adjust an output of said electronic control as a function of the offset, wherein said magnetic element is rotatably interconnected with the movable component and said at least one magnetoresponsive sensor is fixedly secured to the frame member of the vehicle.

20. The vehicular magnetic level sensor of claim 19, wherein the movable component is one of a control arm and a suspension unit and the generally linear movement is a generally vertical movement of one of the control arm and the suspension unit relative to the frame member.

21. A vehicular magnetic level sensor adapted for interconnecting with a generally linearly movable component on a vehicle, said level sensor being operable to determine an orientation of the movable component relative to a frame member of the vehicle and comprising:

a magnetic element which generates a magnetic field;

at least one magnetoresponsive sensor for sensing the magnetic field generated by said magnetic element, said magnetic element being spaced from said at least one magnetoresponsive sensor and being movable relative thereto, said at least one magnetoresponsive sensor detecting a change in the magnetic field associated with a movement of said magnetic element relative to said at least one magnetoresponsive sensor, one of said magnetic element and said at least one magnetoresponsive sensor being interconnected to the component of the vehicle such that a generally linear displacement of the movable component causes a corresponding movement of said one of said magnetic element and said at least one magnetoresponsive sensor relative to the other of said magnetic element and said at least one magnetoresponsive sensor; and an electronic control for analyzing an output of said at least one magnetoresponsive sensor and determining a degree of movement of said one of said magnetic element and said at least one magnetoresponsive sensor in response to the output of said at least one magnetoresponsive sensor, said electronic control being operable to determine an offset in the output of said at least one magnetoresponsive sensor and adjust an output of said electronic control as a function of the offset, wherein the output of said at least one magnetoresponsive sensor is associated with a coordinate system associated with one of said at least one magnetoresponsive sensor and said magnetic element, said coordinate system being defined by data points having a first and second component, said electronic control being operable to average corresponding values of sampled data points to determine the offset.

22. The vehicular magnetic level sensor of claim 21, wherein said electronic control is operable to determine the offset by sampling at least two pair of data points and averaging a corresponding value associated with each of the at least two pair of data points.

23. The vehicular magnetic level sensor of claim 22, wherein said electronic control is operable to sample at least one equal and opposite pair of data points and average an opposite component of each data point of the at least one equal and opposite pair of data points.

24. The vehicular magnetic level sensor of claim 22, wherein the at least two pair of data points define a first pair of data points and a second pair of data points, the first pair of data points having a common first component and an uncommon second component associated with the coordinate system, a first set of corresponding values being ordinate values of the uncommon second components of the first pair of data points, while the second pair of data points having a common second component and an uncommon first component, a second set of corresponding values being ordinate values of the uncommon first components of the second pair of data points, said control being operable to average each set of corresponding values to determine the offset for each component of the coordinate system.

25. The vehicular magnetic level sensor of claim 21, wherein said magnetic element is rotatable relative to said at least one magnetoresponsive sensor, said electronic control being operable to determine an angle of rotation of said magnetic element relative to said at least one magnetoresponsive sensor.

26. The vehicular magnetic level sensor of claim 21, wherein said electronic control includes a processor which is operable to calculate the offset in the output of said at least one magnetoresponsive sensor.

27. The vehicular magnetic level sensor of claim 21, wherein said at least one magnetoresponsive sensor comprises one of a magnetoresistive sensor, a magnetocapacitive sensor, a magnetoinductive sensor and a flux gate sensor.

28. A calibration method of a control which is operable to calibrate a vehicular magnetic level sensor, said level sensor being operable to determine an orientation of a movable component of a vehicle relative to a frame member of the vehicle, said method comprising the steps of:

providing a magnetoresponsive sensor which is operable to sense a magnetic field generated by a magnetic element, said magnetic element being movable relative to said magnetoresponsive sensor;

sampling at least two data points of an output of said magnetoresponsive sensor;

determining an offset of the output of said magnetoresponsive sensor in response to the at least two data points; and adjusting an output of said control in response to the offset.

29. The calibration method of claim 28, wherein after the step of sampling at least two data points, said calibration method further comprises the step of:

determining a first ordinate and a second ordinate for each of the at least two data points relative to an origin of a coordinate system associated with said magnetoresponsive sensor, the offset being an offset from a zero value of the coordinator system, the offset being determined in response to the first and second ordinates for the at least two data points.

30. The calibration method of claim 29, wherein the at least two data points define at least one corresponding pair of data points which are substantially oppositely positioned relative to one of a first and second axis of the coordinate system, the step of determining an offset comprising the step of:

averaging substantially opposite values of the at least one corresponding pair of data points to determine the offset of the values from the zero value of the coordinate system.

31. The calibration method of claim 28, wherein said control is operable to sample at least one equal and opposite pair of data points and average the substantially opposite values of each data point of the at least one equal and opposite pair of data points.

32. The calibration method of claim 28, wherein said control continuously samples data points and determines the offset, said control continuously adjusting the output of said level sensor in response to the offset.

33. The calibration method of claim 28, wherein after the step of sampling the at least two data points, said calibration method further comprises the step of determining if the at least two data points are valid by determining if a difference between the at least two data points is greater than a predetermined value.

34. The calibration method of claim 28, wherein said level sensor is mounted at a frame of a vehicle and at a movable component of the vehicle which is movable relative to the frame, said level sensor being operable to measure a generally linear movement of the movable component relative to the frame via a corresponding rotation of said magnetic element relative to said magnetoresponsive sensor.

35. The calibration method of claim 34, wherein the generally linear movement is a generally vertical movement of the movable component relative to the frame of the vehicle.

36. The calibration method of claim 35, wherein said control is operable to activate at least one of a pump and a valve to adjust a suspension device of the vehicle in response to the output of said magnetoresponsive sensor and the offset.

* * * * *